US006606353B1

(12) United States Patent
McDowell et al.

(10) Patent No.: US 6,606,353 B1
(45) Date of Patent: Aug. 12, 2003

(54) MULTI-POSITION SWITCH FOR SINGLE DIGITAL I/O PIN

(75) Inventors: Richard L. McDowell, Chalfont, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/357,327

(22) Filed: Jul. 20, 1999

(51) Int. Cl.[7] ................................................ H04B 17/00
(52) U.S. Cl. ........................................................ 375/224
(58) Field of Search ................................ 375/224, 296, 375/226, 228, 297, 239; 324/403, 411, 415, 436, 537, 605, 76.59, 76.82, 442, 356, 707, 619, 338; 341/141, 149, 150, 172, 144; 361/189, 190

(56) References Cited

U.S. PATENT DOCUMENTS 5,058,605 A * 10/1991 Slovak ........................ 607/72
5,122,755 A * 6/1992 Nootbaar et al. ........... 324/678
5,343,744 A * 9/1994 Ammann ................. 73/170.13
5,448,035 A * 9/1995 Thutt et al. .............. 219/76.13
5,574,374 A * 11/1996 Thompson et al. ......... 324/338
5,589,844 A * 12/1996 Belcher et al. ............. 343/860
5,708,363 A * 1/1998 Yates et al. ................. 324/442
5,984,880 A * 11/1999 Lander et al. .............. 600/595
6,026,126 A * 2/2000 Gaetano ...................... 375/296
6,152,367 A * 11/2000 Kowalski .................... 235/382

* cited by examiner

*Primary Examiner*—Emmanuel Bayard
(74) *Attorney, Agent, or Firm*—William H. Bollman

(57) ABSTRACT

The present invention provides a circuit arrangement and technique for detecting any of a plurality of positions of a multi-position switch using a single input pin of a digital input/output device. Two specific embodiments are described relating to the use of a multi-position switch using a single digital input/output (DIO). In the first embodiment, a multi-position switch switches between various clock signals (e.g., pre-existing clock signals) on a circuit board, and inputs the same to the relevant pin of the. DIO device. In a variation of this embodiment, a second multi-position switch is connected in series with the first multi-position switch and varies the selected signal in a detectable and distinguishable way, e.g., by inverting or not inverting the signal selected by the first multi-position switch. In another embodiment, a multi-position switch switches between nodes of a series chain of resistors to produce a change to an RC circuit that will respond differently to a step change to the input depending upon the position of the multi-position switch. In either case, the positions of a multi-position (i.e., at least two position) switch can be detected using only one input pin of a digital input/output device.

18 Claims, 3 Drawing Sheets

MULTI-POSITION SWITCH FOR SINGLE DIGITAL I/O PIN

BACKGROUND OF THE INVENTION

1. Field of the Invention

This invention relates generally to input switches for digital devices. More particularly, it relates to the conservation of valuable digital input/output (DIO) pins and ports in a digital device or circuit by providing a circuit and technique for a multi-position switch to be sensed using a single DIO pin.

2. Background of Related Art

Increased competition for less expensive electronics drives designers to increase the capabilities while reducing the number of components. For instance, as a result, programmable devices such as Digital Signal Processors (DSPs) are packed with more and more functionality. Moreover, to reduce the size and cost of such devices, the number of input and output pins are preferably kept to a minimum.

However, trends in consumer electronics such as telephone answering devices (TADs) and cordless phones require more and more user selectable features. To allow for the large number of features, the user is often provided with a number of multi-position switches to select desired features. Many features, e.g., digitally selected speaker volume, ringer on/off, number of rings until auto-answer, etc. have in the past used multi-position switches to provide immediate visible "feedback" of the selected feature as determined by the physical position of the multi-position switch.

Unfortunately, multi-position switches each require a corresponding plurality of input pins to a suitable DIO device to allow a host processor to determine its position.

FIG. 5 shows a conventional circuit for measuring multiple positions of a multi-position switch using a corresponding plurality of input pins of a suitable digital input/output (DIO) device.

In particular, in FIG. 5, a multi-position switch 510 pulls to ground any one of a plurality of input pins to a suitable digital input/output (DIO) device 530. The input pins are otherwise pulled-up to a power source level, either using external resistors 520 as shown in FIG. 5, and/or using internal current paths (e.g., transistors) to the power source within the DIO device 530 itself.

The relevant input pins of the DIO device 530 are read once at a suitable time by the processor 540, and the position of the multi-position switch 510 is determined by locating the logic low pin of the DIO device 530.

Unfortunately, as is seen in FIG. 5, as the number of positions of the multi-position switch increases, and/or as the number of multi-position switches increases in any particular design, so too does the required number of input pins in a suitable DIO device.

There is a need for an apparatus and technique which allows the positions of larger multi-position switches and/or more multi-position switches to be detected without necessarily increasing the number of input pins in a related DIO device.

SUMMARY OF THE INVENTION

In accordance with the principles of the present invention, a digital circuit for measuring a plurality of positions of a multi-position switch using a single digital input pin comprises a multi-position switch having at least three positions. A clock signal is input to at least one position node of the multi-position switch. A digital input device has a single digital input pin in communication with a common node of the multi-position switch.

A digital circuit for measuring a plurality of positions of a multi-position switch using a single digital input pin in accordance with another aspect of the present invention comprises a multi-position switch. A series resistor chain is connected at one end to a power source. The series resistor chain forms a plurality of nodes each connected to a corresponding input position of the multi-position switch. A digital input device having a single digital input pin is included, as is an RC network between a common node of the multi-position switch and the single digital input pin.

A method of determining a position of each of a plurality of multi-position switches in accordance with yet another aspect of the present invention comprises combining a first multi-position switch in series with a second multi-position switch. An output of the second multi-position switch is input into a single digital input pin. A position of the first multi-position switch and a position of the second multi-position switch are determined by repeatedly sampling the single digital input pin.

A method of determining a position of a multi-position switch having at least three positions using a single digital input pin in accordance with still another aspect of the present invention comprises inputting a clock signal to at least one input position of the multi-position switch. A signal other than the clock signal is input to another input position of the multi-position switch. The single digital input pin is repeatedly sampled to determine a presence of the clock signal.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a circuit arrangement and technique for detecting any of a plurality of positions of a multi-position switch using a single input pin of a digital input/output device.

In particular, two specific embodiments are described relating to the use of a multi-position using a single digital input/output (DIO). In the first embodiment, a multi-position switch switches between various clock signals (e.g., pre-existing clock signals) on a circuit board, and inputs the same to the relevant pin of the DIO device. In another embodiment, a multi-position switch switches between nodes of a series chain of resistors to produce a change to an RC circuit that will respond differently to a step change to the input depending upon the position of the multi-position switch. In either case, the positions of a multi-position switch (e.g., 3 or more position) can be detected using only one input pin of a digital input/output device.

Figure 1:
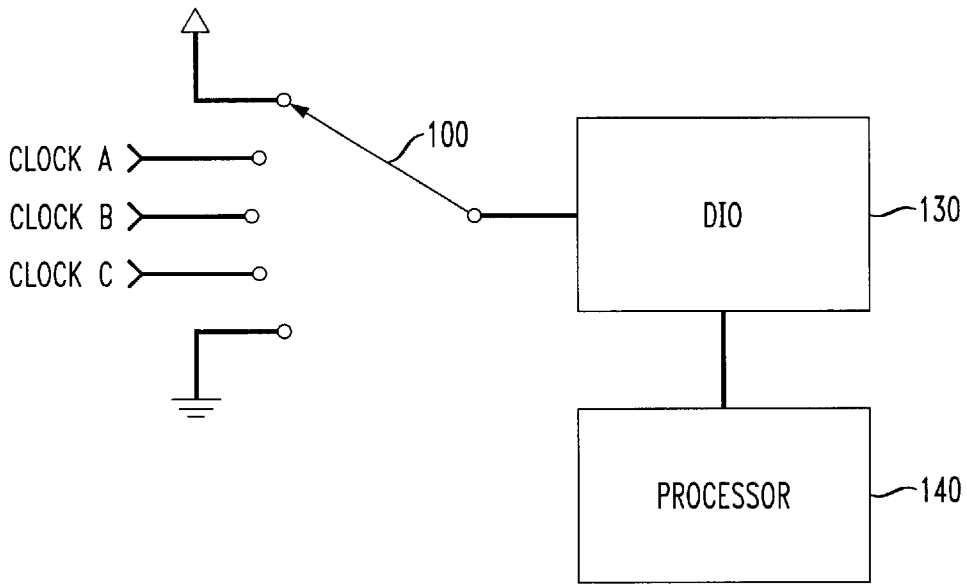
FIG. 1 shows the first embodiment of the present invention wherein a multi-position switch is arranged to switch between one or more clock signals, and inputs the same to the relevant pin of the DIO device for measurement of the relevant clock signal, in accordance with the principles of the present invention.

FIG. 1 shows the first embodiment of the present invention wherein a multi-position switch is arranged to switch between one or more clock signal, and inputs the same to the relevant pin of the DIO device for measurement of the relevant clock signal, in accordance with the principles of the present invention.

In particular, in FIG. 1, a multi-position switch 100 is positioned between at least one clock signal (e.g., clock signal A), and an input pin of a suitable digital input/output (DIO) device 130. The DIO device 130 is used by a suitable processor 140 (e.g., a digital signal processor (DSP), a microprocessor, or a microcontroller), to determine the relevant input signal switched by the multi-position switch 100. To show the flexibility of the present invention, the multi-position switch 100 is shown in FIG. 1 as switching between any of five positions, including a power supply, a first clock signal A, a second clock signal B, a third clock signal C, and a ground.

Preferably, to reduce costs and complexity, the clock signals A, B and/or C are clock signals which are otherwise pre-existing in the relevant circuit board.

In accordance with this embodiment, The processor 140 repeatedly samples the relevant input pin of the DIO device 130 to determine the nature of the input signal, i.e., to distinguish between the five possible choices of input signal (power, ground, or clock signals A, B or C).

Figure 2:
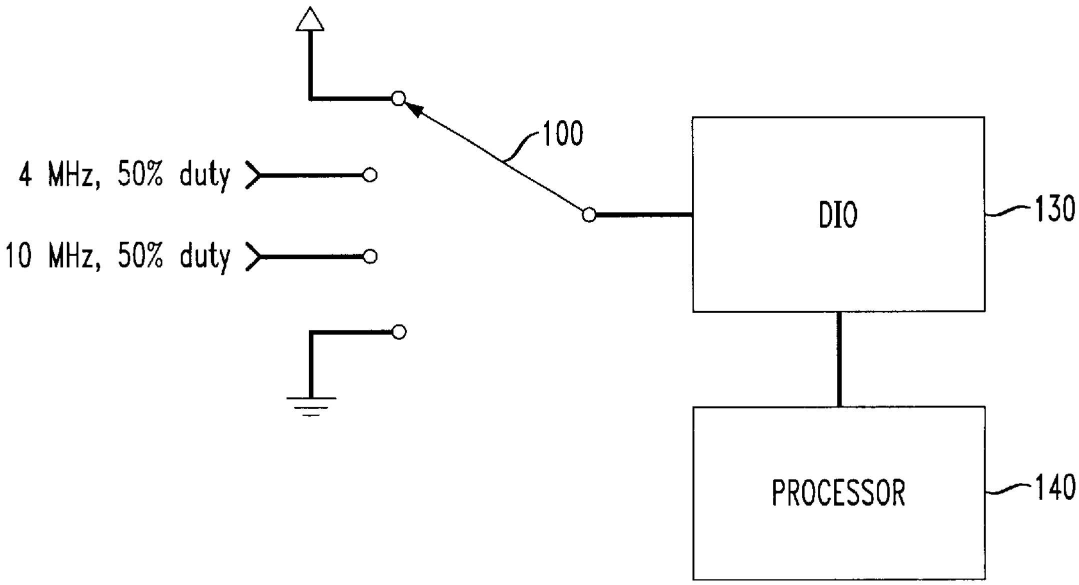
FIG. 2 shows a particular example of the implementation shown in FIG. 1 using a four position multi-position switch to switch the input to the relevant pin of the DIO device between a power source level, a 4 MHz, 50% duty cycle clock signal, a 10 MHz, 50% duty cycle clock signal, and a ground signal.

FIG. 2 shows a particular example of the implementation shown in FIG. 1 using a four position multi-position switch to switch the input to the relevant pin of the DIO device 130 between a power source level, a 4 MHz, 50% duty cycle clock signal, a 10 MHz, 50% duty cycle clock signal, and a ground signal.

In the example of FIG. 2, a processor such as a DSP having a particular rating, e.g., a 40 MIP DSP, reads (i.e., inputs) from the relevant pin of the DIO device 130 in a regular or periodic fashion, e.g., every 15 instructions or so. The DSP then evaluates the input signal over a period of input signals to distinguish among the plurality of possible input signals as selected by the multi-position switch 100. Once the input signal is recognized and associated with a particular position of the wiper of the multi-position switch, the position of the multi-position switch can be acted upon in a suitable manner by the DSP 140.

For instance, the DSP 140 can determine if the relevant input pin of the DIO device 130 is constantly high, constantly low, or toggling at one of the two possible rates to determine the position of the wiper of the multi-position switch. For this example, the evaluation could take place at an 8 kHz rate. Moreover, multiple evaluations can be determined and compared to provide a "debouncing" of the position of the multi-position switch 100 to provide a more accurate reading.

Of course, the switched clock signals need not be the same as those disclosed herein. Rather, each of the switched clock signals may be any suitable clock signal capable of being measured by the processor 140 through the DIO device 130.

A possible variation in accordance with the principles of the present invention is to use various duty cycles of a same clock signal each input separately to the multi-position switch and measured by the processor 140.

Along this vein, one or more clock signals which do not necessarily have a 50% duty cycle may be implemented to either increase the possible positions measurable by a particular processor and/or to increase the number of separate switches which can be ganged and detected by a common single input pin of the DIO device 130.

Figure 3:
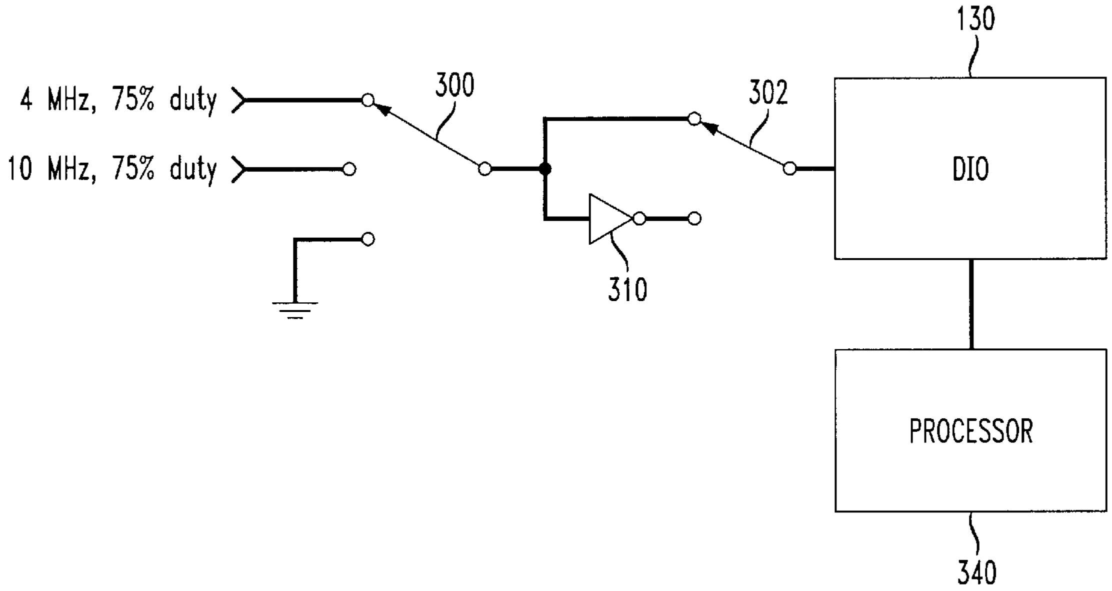
FIG. 3 shows that a single multi-position switch and/or a combination of one or multi-position switches may be used to form the basis of an input signal to a single DIO, in accordance with the principles of the present invention.

FIG. 3 shows that a single multi-position switch and/or a combination of one or multi-position switches may be used to form the basis of an input signal to a single DIO 130, in accordance with the principles of the present invention.

In particular, as shown in FIG. 3, an additional two-position switch can be added which merely inverts the signal input to the relevant input pin of the DIO device 130 from the first multi-position switch depending upon its position. The inversion can be easily detected by the processor 340 when using a clock signal having a duty cycle significantly other than 50%, e.g., 75%.

For example, if the clock signals switched by a first multi-position switch 300 as shown in FIG. 3 have a 75% duty cycle, an exemplary three-position switch would select from among (1) ground, (2) the 4 MHz clock, and (3) the 10 MHz clock, and a second, two-position switch would switch an inverter in and out.

In this case, the processor (e.g., DSP) 340 would not only determine the frequency of the clock signal switched by the first multi-position switch 300, but would also determine the duty cycle of the clock signal as well. Using a 75% duty cycle clock signal, if the processor 340 reads a clock signal having a 25% duty cycle, it can be deduced that the second, two-position switch 302 is in the second, or "inverter" position, as shown in FIG. 3.

Using different duty cycles for the various switch positions, many more throws of a multi-position switch can be sensed using a single pin of the same DIO device. For instance, a single six (or more)-position switch can be configured using (1) ground, (2) a power source, (3) a first duty cycle of a first clock signal, (4) a second duty cycle of the first clock signal, (5) a first duty cycle of a second clock signal, and (6) a second duty cycle of the second clock signal.

The principles of the present invention are typically invisible to the user of electronic equipment, yet allow for a greatly expanded input/output (I/O) capability. For instance, the digitally selected volume of a telephone answering system using a first multi-position switch 300 together with the position of a ringer using a second multi-position switch 302 can all be determined using a single pin of a suitable DIO device such as that shown in FIG. 3.

If board space and/or the cost of materials permits, an oscillator could be implemented to provide any or all of the various frequency clock signals. Alternatively, one or more digital output pins of the same or different DIO device 130 can be used in coordination with the processor to generate a clock signal that would be useful for use by one or more multi-position switches.

Figure 4:
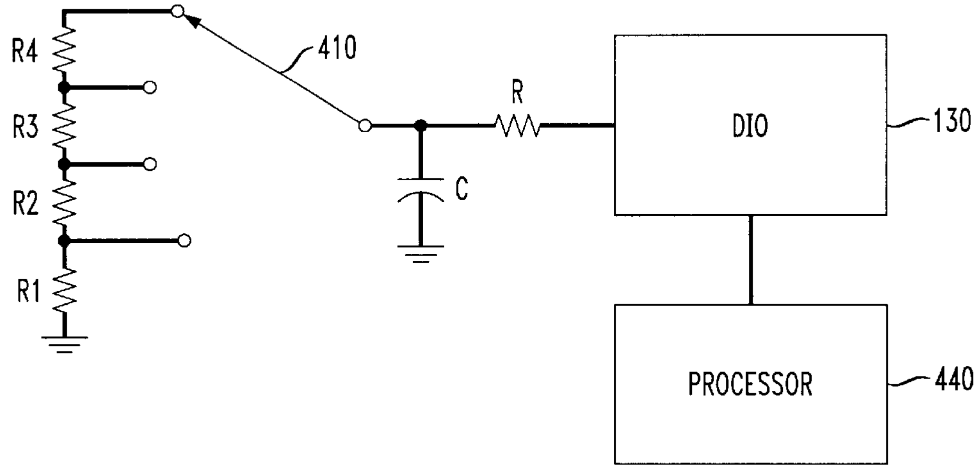
FIG. 4 shows another embodiment in accordance with the principles of the present invention relates to a multi-position switch which switches between different resistor sets to change the step response of a resistor/capacitor (RC) circuit.
Figure 5:
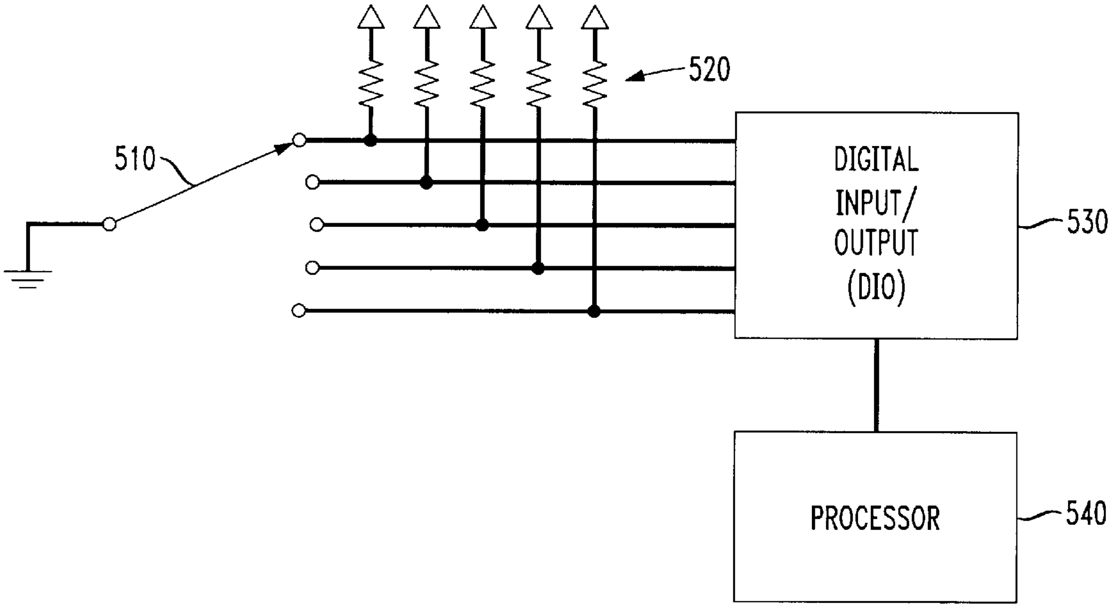
FIG. 5 PRIOR ART
FIG. 5 shows a conventional circuit for measuring multiple positions of a multi-position switch using a corresponding plurality of input pins of a suitable digital input/output (DIO) device.

FIG. 4 shows another embodiment in accordance with the principles of the present invention relating to the utilization of a series chain of switched resistors to vary the discharge time of an RC network, and thus vary the length of time until a logic high signal is discharged to a logic low (e.g., TTL or CMOS) level as measured by the DIO device 130. In accordance with this embodiment, the wiper of a multi-position switch 410 switches between different resistor sets to change the step response of a resistor/capacitor (RC) circuit.

In particular, in FIG. 4, a multi-position switch 410 selects any of a plurality of nodes along a series connection of resistors R1–R4. In the disclosed embodiment, resistors R1–R4 all have the same value, e.g., 50 K.

The common node of the multi-position switch 140 charges an RC network comprising a series resistor R input to the DIO 130, and a capacitor C to ground. As shown in FIG. 4, resistor R includes the input impedance of the DIO 130.

The RC time constant formed by the resistor R and capacitor C is coordinated with the sampling cycle of the processor 440 through the DIO 130. For instance, in the disclosed example, the processor 440 samples the relevant DIO pin at a 16 KHz rate. In this example, the resistor R has a value of, e.g., 1 K, and the capacitor C has a value of, e.g., 0.01 $\mu$F.

In operation, the processor 440 (e.g., a DSP, a microprocessor, or a microcontroller) drives the relevant pin of the digital input/output device 130 high for a sufficient amount of time to ensure that the RC circuit comprising the resistor R and capacitor C reaches a steady state. Thereafter, the processor 440 changes the relevant pin of the digital input/output device 130 to be configured as an input. Preferably, a fixed amount of time after the pin is reconfigured as an input, e.g., at a 16 KHz rate, the pin is read and re-read as an input until the input pin finally reads at a logic low level. The length of time between when the pin was reconfigured as an input and when the pin finally read as a logic low corresponds to the position of the multi-position switch.

Thus, in accordance with this aspect of the present invention, the processor 440 times how long the signal takes to drop to a logical zero level as the RC circuit responds to the drop in the driven signal. A correspondence between the length of time and a particular position of the multi-position switch 410 is established in the processor 440 such that the measured time difference indicates the position of the multi-position switch 410.

Of course, the circuit of FIG. 4 preferably includes sufficient tolerance in the measured time to ensure an accurate reading of the position of the multi-position switch 410, e.g., to accommodate sampling deviations caused, e.g., from processing interrupts and other critical path operations, and/or differences in the values of the resistors R1 to R4.

In the.embodiment of FIG. 4, the signal input from the DIO 130 is preferably "debounced" (i.e., repeatedly read with spurious readings ignored) to ensure an accurate reading.

The digital input can be configured as an interrupt. In such a case, the digital input preferably starts a timer when the level of the driven output of the relevant pin of the DIO 130 changes, and the timer is read when the relevant interrupt is processed to determine the length of time it took for the RC circuit to discharge.

A variation to this embodiment is to use another DIO pin or a pre-existing signal on the circuit board rather than use the pin of the DIO 130 as both the output and input to the RC circuit. For example, a signal such as a keypad scan line that occasionally (and predictably) changes state to allow for the reading of key presses may be used as a switched clock signal to charge the RC circuit.

Multiple multi-position switches can be ganged together with corresponding resistor changes R1–R4 in a fashion similar to that shown in FIG. 3 to form a larger number of input positions and/or to accommodate a plurality of multi-position switches, in accordance with the principles of the present invention.

The present invention provides the advantage of a reduced utilization of valuable digital I/O pins and/or ports. Moreover, the number of features available through the same number of digital I/0 pins and/or ports will be significantly increased, and the overall cost of a device can be reduced significantly. The principles of the present invention are flexible enough to be applied and implemented in any of a variety of applications, in any of a variety of devices.

In the embodiments of FIGS. 1–4, various pull-up resistors may be used as will be known to those of ordinary skill in the art, but have been eliminated in FIGS. 1–4 for simplicity of explanation.

The "clock" signal as described herein need not necessarily be a true clock signal. Rather, the clock signal need only be a uniquely recognizable signal (e.g., a header word via a serial interface).

While the invention has been described with reference to the exemplary embodiments thereof, those skilled in the art will be able to make various modifications to the described embodiments of the invention without departing from the true spirit and scope of the invention.

What is claimed is:

1. A digital circuit for measuring a plurality of positions of a multi-position switch using a single digital input pin, comprising:

a multi-position switch having at least three positions;

a clock signal input to at least one position node of said multi-position switch;

a digital input device having said single digital input pin in communication with a common node of said multi-position switch; and a processor adapted to repeatedly sample said single digital input pin using said digital input device.

2. The digital circuit for measuring a plurality of positions of a multi-position switch using a single digital input pin according to claim 1, further comprising:

a ground signal input to a second position node of said multi-position switch.

3. The digital circuit for measuring a plurality of positions of a multi-position switch using a single digital input pin according to claim 1, further comprising:

a power supply level input to a second position node of said multi-position switch.

4. The digital circuit for measuring a plurality of positions of a multi-position switch using a single digital input pin according to claim 2, further comprising:

a power supply level input to a third position node of said multi-position switch.

5. The digital circuit for measuring a plurality of positions of a multi-position switch using a single digital input pin according to claim 1, wherein:

said processor is further adapted to distinguish said clock signal from other signals input to other input positions of said multi-position switch.

6. The digital circuit for measuring a plurality of positions of a multi-position switch using a single digital input pin according to claim 1, wherein:

said clock signal is approximately a 50% duty cycle clock signal.

7. A digital circuit for measuring a plurality of positions of a multi-position switch using a single digital input pin, comprising:

a multi-position switch having at least three positions;

a clock signal input to at least one position node of said multi-position switch, said clock signal being significantly other than a 50% duty cycle clock signal; and a digital input device having said single digital input pin in communication with a common node of said multi-position switch.

8. A digital circuit for measuring a plurality of positions of a multi-position switch using a single digital input pin, comprising:

a multi-position switch having at least three positions;

a clock signal input to at least one position node of said multi-position switch;

a digital input device having said single digital input pin in communication with a common node of said multi-position switch;

a second multi-position switch in series with said multi-position switch having at least three positions; and an inverter in communication with one position of said second multi-position switch, said inverter inverting a signal from said common node of said multi-position switch before input to said one position of said second multi-position switch.

9. The digital circuit for measuring a plurality of positions of a multi-position switch using a single digital input pin according to claim 8, wherein:

said second multi-position switch is a single pole, double throw switch.

10. A digital circuit for measuring a plurality of positions of a multi-position switch using a single digital input pin, comprising:

a multi-position switch;

a series resistor chain connected at one end to a power source, said series resistor chain forming a plurality of nodes each connected to a corresponding input position of said multi-position switch;

a digital input device having said single digital input pin; and an RC network between a common node of said multi-position switch and said single digital input pin.

11. The digital circuit for measuring a plurality of positions of a multi-position switch using a single digital input pin according to claim 10, further comprising:

a processor adapted to repeatedly sample said single digital input pin using said digital input device, and to determine a length of time for said RC network to discharge;

wherein said length of time corresponds to a position of said multi-position switch.

12. A method of determining a position of each of a plurality of multi-position switches, comprising:

combining a first multi-position switch in series with a second multi-position switch;

inputting an output of said second multi-position switch into a single digital input pin; and determining a position of said first multi-position switch and a position of said second multi-position switch by repeatedly sampling said single digital input pin.

13. A method of determining a position of a multi-position switch having at least three positions using a single digital input pin, comprising:

inputting a clock signal to at least one input position of said multi-position switch;.

inputting a signal other than said clock signal to another input position of said multi-position switch; and repeatedly sampling said single digital input pin to determine a presence of said clock signal.

14. The method of determining a position of a multi-position switch having at least three positions using a single digital input pin according to claim 13, wherein:

said signal other than said clock signal is one of a ground signal and a power source level signal.

15. The method of determining a position of a multi-position switch having at least three positions using a single digital input pin according to claim 13, wherein:

said signal other than said clock signal is another clock signal different from said clock signal.

16. The method of determining a position of a multi-position switch having at least three positions using a single digital input pin according to claim 13, wherein:

said signal other than said clock signal has a duty cycle different from that of said clock signal.

17. Apparatus for determining a position of each of a plurality of multi-position switches, comprising:

means for combining a first multi-position switch in series with a second multi-position switch;

means for inputting an output of said second multi-position switch into a single digital input pin; and means for determining a position of said first multi-position switch and a position of said second multi-position switch by repeatedly sampling said single digital input pin.

18. Apparatus for determining a position of a multi-position switch having at least three positions using a single digital input pin, comprising:

means for inputting a clock signal to at least one input position of said multi-position switch;

means for inputting a signal other than said clock signal to another input position of said multi-position switch; and means for repeatedly sampling said single digital input pin to determine a presence of said clock signal.

* * * * *